US012090754B2

(12) United States Patent
Son et al.

(10) Patent No.: US 12,090,754 B2
(45) Date of Patent: Sep. 17, 2024

(54) NOZZLE INSPECTION METHOD, NOZZLE INSPECTION APPARATUS, AND SUBSTRATE PROCESSING APPARATUS INCLUDING THE SAME

(71) Applicant: SEMES CO., LTD., Chungcheongnam-do (KR)

(72) Inventors: Sang Uk Son, Gyeonggi-do (KR); Yong Tak Hyun, Seoul (KR); Dae Sung Kim, Chungcheongnam-do (KR)

(73) Assignee: SEMES CO., LTD., Chungcheongnam-Do (KR)

( * ) Notice: Subject to any disclaimer, the term of this patent is extended or adjusted under 35 U.S.C. 154(b) by 159 days.

(21) Appl. No.: 17/870,835

(22) Filed: Jul. 22, 2022

(65) Prior Publication Data

US 2023/0066695 A1 Mar. 2, 2023

(30) Foreign Application Priority Data

Aug. 24, 2021 (KR) ........................ 10-2021-0111462

(51) Int. Cl.
*B41J 2/045* (2006.01)

(52) U.S. Cl.
CPC ......... *B41J 2/0451* (2013.01); *B41J 2/04586* (2013.01)

(58) Field of Classification Search
CPC .... B41J 2/0451; B41J 2/04586; B41J 2/2142; B41J 29/393; B41J 2029/3935; G01N 21/95607; G01N 21/8851; G01N 2021/887
USPC ............................................................ 347/14
See application file for complete search history.

(56) References Cited

U.S. PATENT DOCUMENTS

2006/0214976 A1* 9/2006 Iwao ...................... B41J 29/393 347/19
2008/0079763 A1* 4/2008 Abrott .................... B41J 29/393 347/19
2008/0303870 A1 12/2008 Verbeek et al.

FOREIGN PATENT DOCUMENTS

| | | |
|---|---|---|
| JP | 2009-520598 | 5/2009 |
| JP | 2017-154302 | 9/2017 |
| JP | 2019-155307 | 9/2019 |
| JP | 2020-52043 | 4/2020 |
| KR | 10-2010-0135392 | 12/2010 |
| KR | 10-2011-0110275 | 10/2011 |
| KR | 10-2012-0077347 | 7/2012 |
| KR | 10-1328214 | 11/2013 |
| KR | 10-2017-0138051 | 12/2017 |
| KR | 10-2019-0100008 | 8/2019 |

(Continued)

OTHER PUBLICATIONS

Office Action dated Aug. 30, 2023 for Korean Patent Application No. 10-2021-0111462 and its English translation by Google Translate.

(Continued)

*Primary Examiner* — Jason S Uhlenhake
*Assistant Examiner* — Alexander D Shenderov
(74) *Attorney, Agent, or Firm* — Womble Bond Dickinson (US) LLP

(57) ABSTRACT

Provided are a nozzle inspection method and a nozzle inspection apparatus capable of accurately detecting a defect in an inkjet head nozzle within a short time. The nozzle inspection method comprises discharging a plurality of droplets into a first region of interest of a substrate using a first nozzle to form an inspection pattern, and determining whether the first nozzle is defective based on the inspection pattern.

19 Claims, 12 Drawing Sheets

(56) References Cited

FOREIGN PATENT DOCUMENTS

| | | |
|---|---|---|
| WO | 2010/090080 | 8/2010 |

OTHER PUBLICATIONS

Office Action dated Aug. 8, 2023 for Japanese Patent Application No. 2022-127625 and its English translation from Global Dossier.

Notice of Allowance dated Jan. 22, 2024 for Korean Patent Application No. 10-2021-0111462 and its English translation from Global Dossier.

* cited by examiner

NOZZLE INSPECTION METHOD, NOZZLE INSPECTION APPARATUS, AND SUBSTRATE PROCESSING APPARATUS INCLUDING THE SAME

This application claims the benefit of Korean Patent Application No. 10-2021-0111462, filed on Aug. 24, 2021, in the Korean Intellectual Property Office, the disclosure of which is incorporated herein by reference in its entirety.

BACKGROUND

1. Field

The present invention relates to a nozzle inspection method, a nozzle inspection apparatus, and a substrate processing apparatus including the same.

2. Description of the Related Art

A printing process (e.g., RGB patterning) is performed on a substrate to manufacture a display device such as an LCD panel, a PDP panel, or an LED panel. A printing process is performed using printing equipment having an inkjet head.

SUMMARY

However, when the chemical solution is not properly discharged from the nozzle of the inkjet head, a defect may occur. Therefore, it is necessary to frequently inspect whether the nozzle of the inkjet head is abnormal. However, the conventional inkjet head inspection takes a lot of time, and the accuracy of defect detection is not high.

An object of the present invention is to provide a nozzle inspection method capable of accurately detecting a defect in an inkjet head nozzle within a short time.

Another object of the present invention is to provide a nozzle inspection apparatus capable of accurately detecting a defect in an inkjet head nozzle within a short time.

Another object of the present invention is to provide a substrate processing apparatus capable of accurately detecting a defect in an inkjet head nozzle within a short time.

The objects of the present invention are not limited to the objects mentioned above, and other objects not mentioned will be clearly understood by those skilled in the art from the following description.

One aspect of the nozzle inspection method of the present invention for achieving the above technical object comprises discharging a plurality of droplets into a first region of interest of a substrate using a first nozzle to form an inspection pattern, and determining whether the first nozzle is defective based on the inspection pattern.

One aspect of the nozzle inspection apparatus of the present invention for achieving the above technical object comprises a stage, on which a substrate is movable; an inkjet head module disposed on the stage and including a first nozzle for forming an inspection pattern by discharging a plurality of droplets into a first region of interest of the substrate; a vision module disposed on the stage and for photographing the inspection pattern; and a control module for determining whether the first nozzle is defective based on the photographing result.

One aspect of the substrate processing apparatus of the present invention for achieving the above technical object comprises a first stage disposed in a first region; a second stage disposed in a second region; a gantry disposed to cross the first stage and the second stage; an inkjet head module installed on the gantry and capable of discharging a droplet in the first stage or the second stage; and a vision module disposed on the second stage, wherein the second stage can move an inspection substrate, wherein the inkjet head module discharges a plurality of droplets into a first region of interest of the inspection substrate to form an inspection pattern, wherein the vision module photographs the inspection pattern.

The details of other embodiments are included in the detailed description and drawings.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
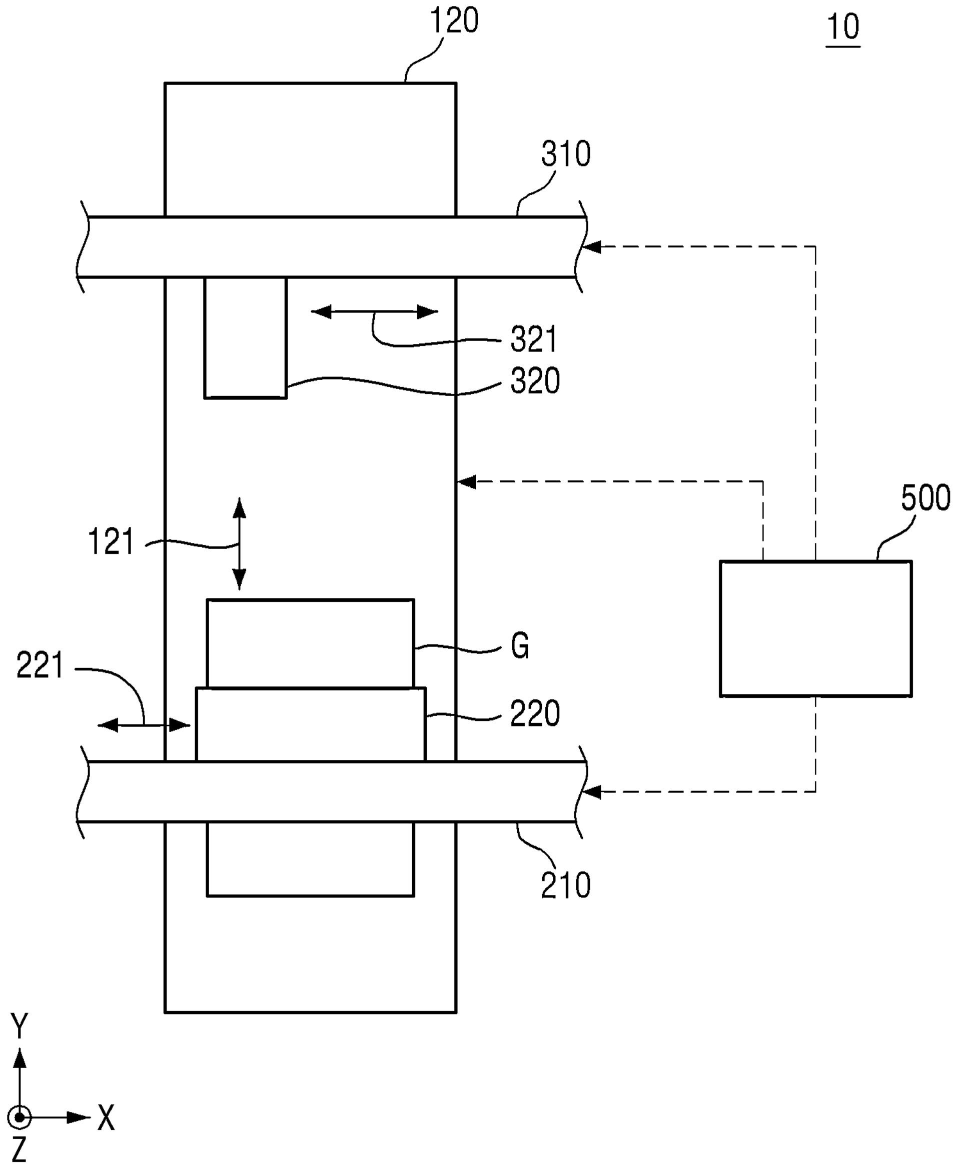
FIG. 1 is a conceptual diagram for describing a nozzle inspection apparatus according to some embodiments of the present invention.

Hereinafter, preferred embodiments of the present disclosure will be described in detail with reference to the accompanying drawings. Advantages and features of the present disclosure and methods of achieving them will become apparent with reference to the embodiments described below in detail in conjunction with the accompanying drawings. However, the present disclosure is not limited to the embodiments described below, but may be implemented in various different forms, and these embodiments are provided only for making the description of the present disclosure complete and fully informing those skilled in the art to which the present disclosure pertains on the scope of the present disclosure, and the present disclosure is only defined by the scope of the claims. Like reference numerals refer to like elements throughout.

Spatially relative terms “below,” “beneath,” “lower,” “above,” and “upper” can be used to easily describe a correlation between an element or components and other elements or components. The spatially relative terms should be understood as terms including different orientations of the device during use or operation in addition to the orientation shown in the drawings. For example, when an element shown in the figures is turned over, an element described as “below” or “beneath” another element may be placed “above” the other element. Accordingly, the exemplary term “below” may include both directions below and above. The device may also be oriented in other orientations, and thus spatially relative terms may be interpreted according to orientation.

Although first, second, etc. are used to describe various elements, components, and/or sections, it should be understood that these elements, components, and/or sections are not limited by these terms. These terms are only used to distinguish one element, component, or section from another element, component, or section. Accordingly, the first element, the first component, or the first section mentioned below may be the second element, the second component, or the second section within the technical spirit of the present disclosure.

Figure 2:
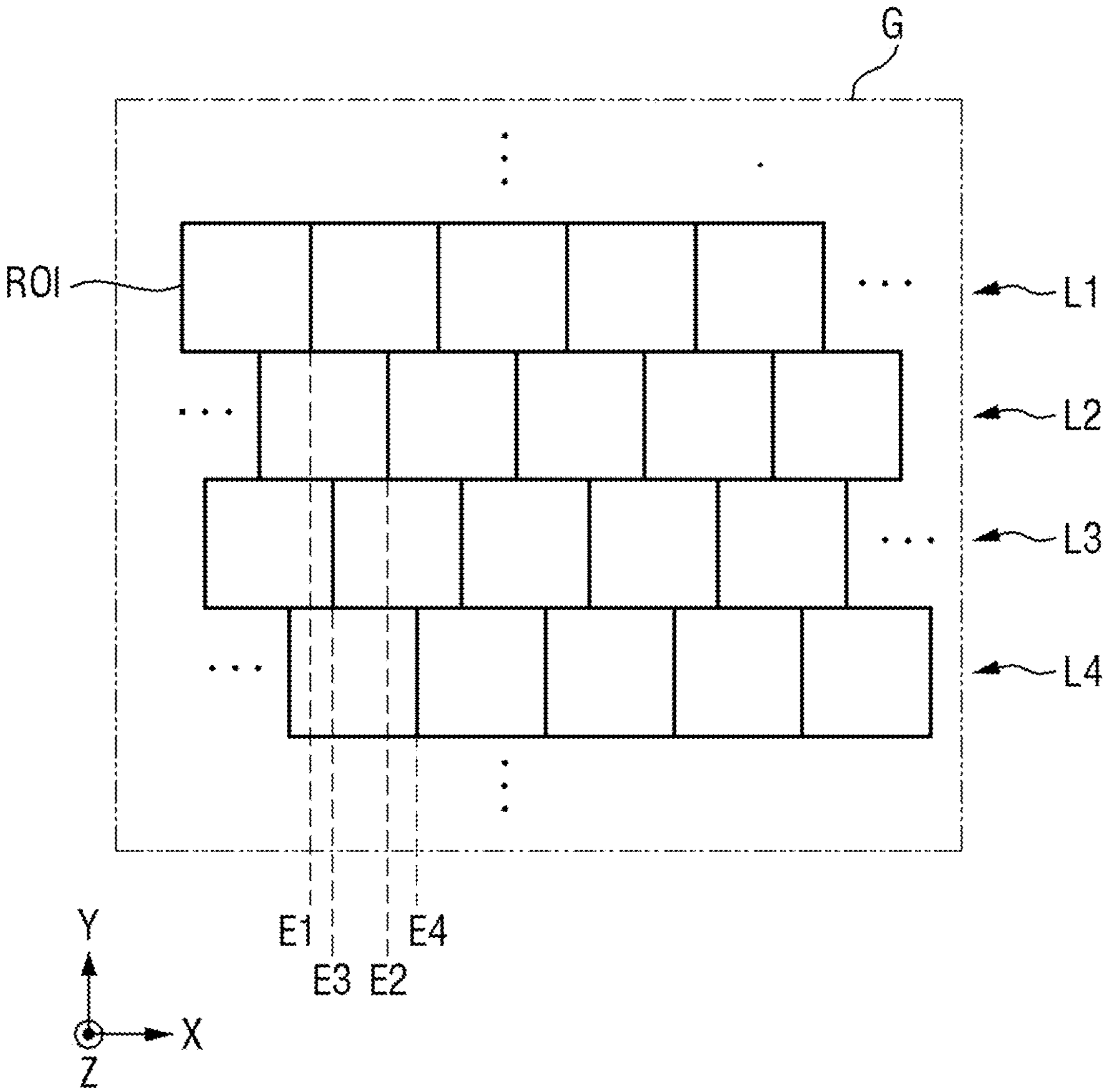
FIG. 2 is a view for describing a plurality of regions of interest of a substrate.

FIG. 1 is a conceptual diagram for describing a nozzle inspection apparatus according to some embodiments of the present invention. FIG. 2 is a view for describing a plurality of regions of interest of a substrate.

First, referring to FIG. 1, a nozzle inspection apparatus 10 according to some embodiments of the present invention includes a stage 120, a first gantry 210, an inkjet head module 220, a second gantry 310, a vision module. 320, a control module 500, and the like.

The stage 120 is a region for supporting and moving the substrate G. A method of moving the substrate G in the stage 120 is not limited to a specific method. For example, the holder may hold and move the substrate G, or the substrate G may be moved by a plate that is moved in a roll-to-roll manner.

The stage 120 may extend in, for example, the second direction y and move the substrate G along the second direction y (see reference numeral 121). Here, the substrate G may be a substrate for inspection, and the substrate for inspection may be a film for inspection, or a transparent substrate (e.g., a glass substrate) used in a display device.

The first gantry 210 is disposed on the stage 120 to cross the stage 120. The first gantry 210 may extend long in the first direction x.

The inkjet head module 220 is installed on the first gantry 210 and can move along the first gantry 210 (see reference numeral 221). As illustrated, the inkjet head module 220 may move in the first direction x, but is not limited thereto. The inkjet head module 220 may include a plurality of heads for discharging ink, and each head may include a plurality of nozzles. The ink may be, for example, QD (Quantum Dot) ink, but is not limited thereto. Although the drawing shows that the width of the inkjet head module 220 and the width of the substrate G are almost similar, the present invention is not limited thereto.

The plurality of nozzles of the inkjet head module 220 discharge a plurality of droplets to a plurality of regions of interest (ROIs) of the substrate G.

Here, referring to FIG. 2, a plurality of ROIs may be disposed on a substrate G in a first direction x and a second direction y. Here, the region of interest (ROI) refers to a virtual region for distinguishing an ink discharged region. The region of interest (ROI) may be determined by the operation of the control module 500. As illustrated, the plurality of regions of interest (ROIs) may be disposed in a plurality of lines L1 to L4. The region of interest (ROI) of the upper line and the region of interest (ROI) of the lower line may be displaced from each other. For example, one end E1 of the region of interest (ROI) of the line L1 and one end E2 of the region of interest (ROI) of the line L2 may be displaced from each other. One end E2 of the region of interest (ROI) of the line L2 and one end E3 of the region of interest (ROI) of the line L3 may be displaced from each other. One end E3 of the region of interest (ROI) of the line L3 and one end E4 of the region of interest (ROI) of the line L4 may be displaced from each other.

The arrangement of the plurality of regions of interest (ROI) may correspond to the arrangement of the plurality of nozzles of the inkjet head module 220.

Specifically, among the plurality of nozzles of the inkjet head module 220, a first nozzle discharges a plurality of droplets to a corresponding region of interest (ROI) to form an inspection pattern (see FIGS. 3 to 13).

The second gantry 310 is disposed on the stage 120 to cross the stage 120. The second gantry 310 may extend long in the first direction x.

The vision module 320 is installed on the second gantry 310 and can move along the second gantry 310 (see reference numeral 321). As illustrated, the vision module 320 may move in the first direction x, but is not limited thereto. The vision module 320 photographs the formed inspection pattern.

The control module 500 controls the stage 120, the first gantry 210, the inkjet head module 220, the second gantry 310, the vision module 320, and the like. Also, the control module 500 may determine whether the first nozzle is defective based on the photographed inspection pattern. The determination method will be described later with reference to FIGS. 14 to 17.

Although not shown separately, the first gantry 210 and the second gantry 310 may move in the second direction y.

Hereinafter, FIGS. 3 to 17 are views for describing a nozzle inspection method according to some embodiments of the present invention.

Figure 3:
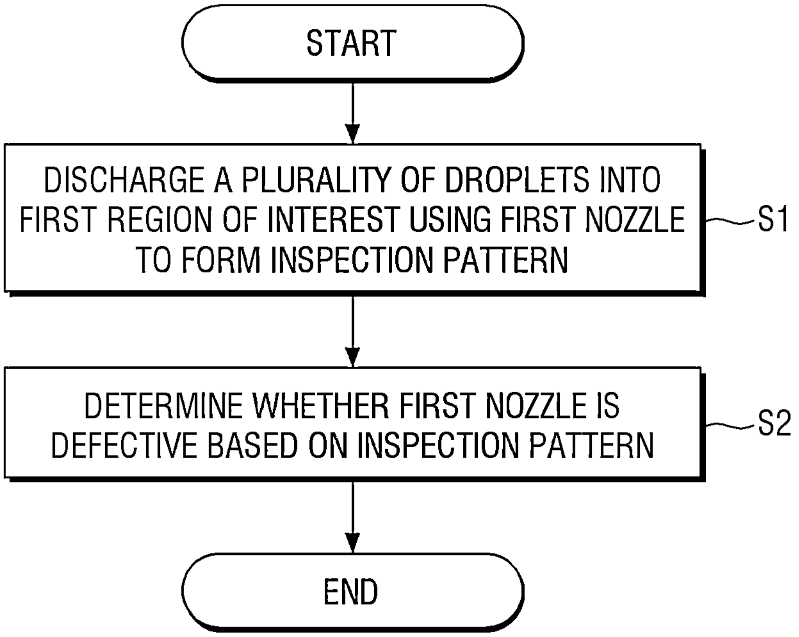
FIG. 3 is a view for describing a nozzle inspection method according to some embodiments of the present invention.
Figure 4:
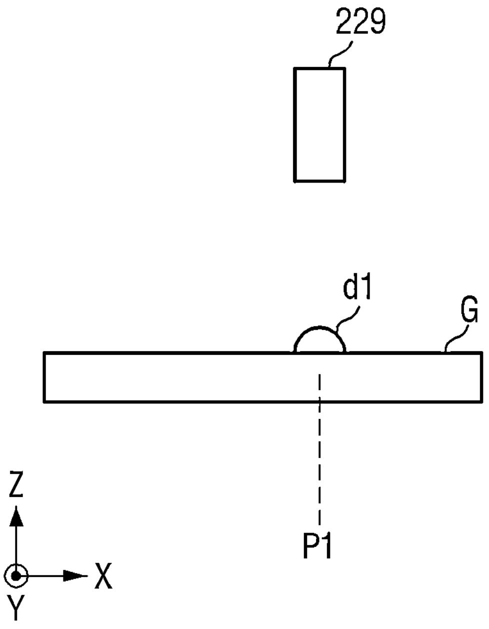
FIGS. 4 and 5 are views of intermediate steps for describing a first example of the inspection pattern forming step S1 of FIG. 3.
Figure 5:
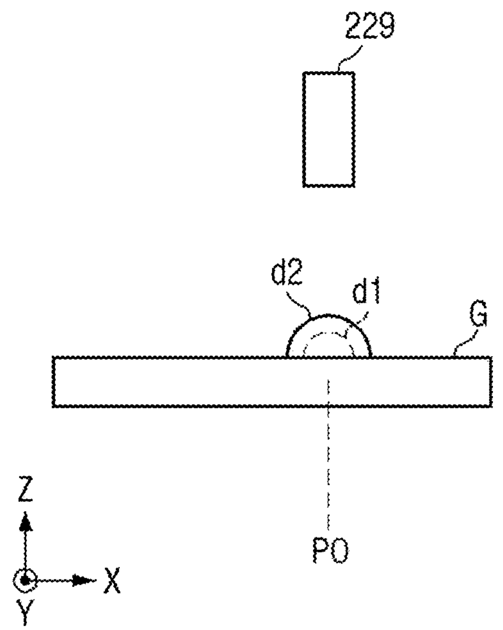

FIG. 3 is a view for describing a nozzle inspection method according to some embodiments of the present invention. FIGS. 4 and 5 are views of intermediate steps for describing a first example of the inspection pattern forming step S1 of FIG. 3.

First, referring to FIG. 3, an inspection pattern is formed by discharging a plurality of droplets into the first region of interest (ROI) using the first nozzle 229 (S1).

As shown in FIG. 4, the substrate G is stopped after moving the substrate G to the position P1 where the droplet is to be discharged. Next, the first droplet d1 is discharged into the first region of interest of the stopped substrate G using the first nozzle 229.

Then, as shown in FIG. 5, the second droplet d2 is discharged again into the first region of interest of the stopped substrate G using the first nozzle 229.

In this way, the droplets are discharged a preset number of times. For example, if the preset number of times is 5 times, the droplets are continuously discharged 5 times.

Next, based on the formed inspection pattern, it is determined whether the first nozzle 229 is defective (S2).

Since a plurality of droplets are discharged into one region of interest to form an inspection pattern, the size of the inspection pattern is increased to increase inspection accuracy. In addition, it may take a lot of time to form and inspect many inspection patterns by individually discharging into many regions of interest with one nozzle. However, in the case of the nozzle inspection method according to some embodiments of the present invention, the inspection time can be shortened because a plurality of droplets are discharged into one region of interest.

FIGS. 6 to 9 are views of intermediate steps for describing a second example of the inspection pattern forming step S1 of FIG. 3.

Figure 6:
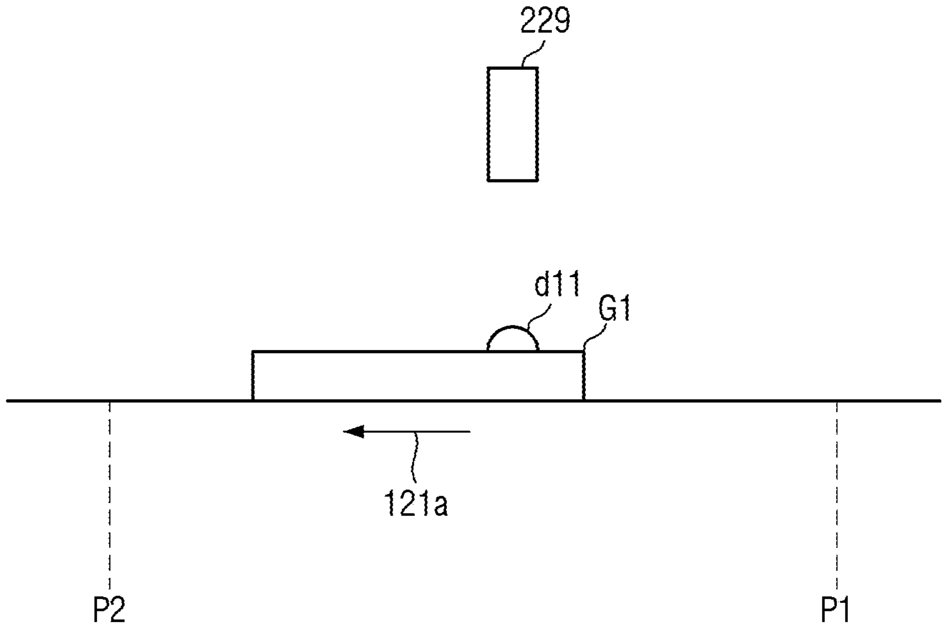
FIGS. 6 to 9 are views of intermediate steps for describing a second example of the inspection pattern forming step S1 of FIG. 3.

Referring to FIG. 6, while moving the substrate G1 from the first position P1 to the second position P2 (see reference numeral 121*a*), the droplet d11 is discharged into the first region of interest using the first nozzle 229.

Figure 7:
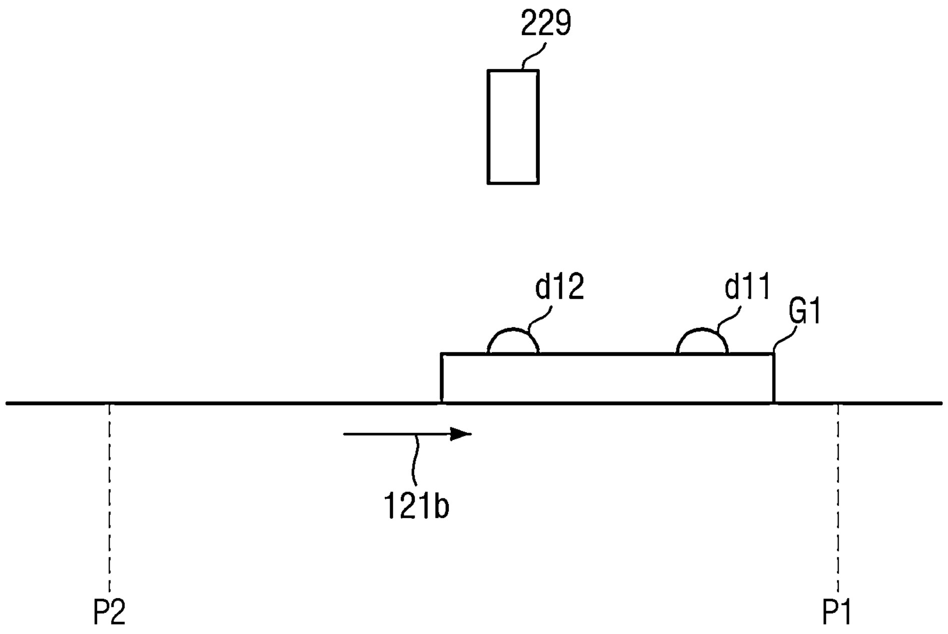

Then, referring to FIG. 7, while moving the substrate G1 from the second position P2 to the first position P1 (see reference numeral 121*b*), the second droplet d12 is discharged into the second region of interest using the first nozzle 229.

Figure 8:
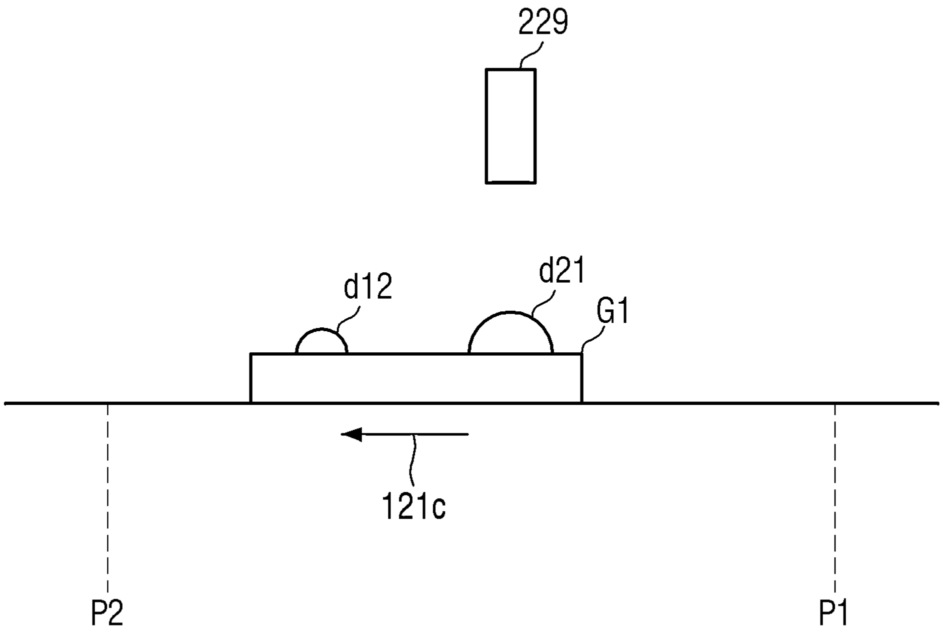

Then, referring to FIG. 8, while moving the substrate G1 from the first position P1 to the second position P2 (see reference numeral 121*c*), a third droplet d21 is discharged into the first region of interest using the first nozzle 229. Since the second droplet (i.e., d11 and d21) fell in the first region of interest, the droplet size in the first region of interest increases.

Figure 9:
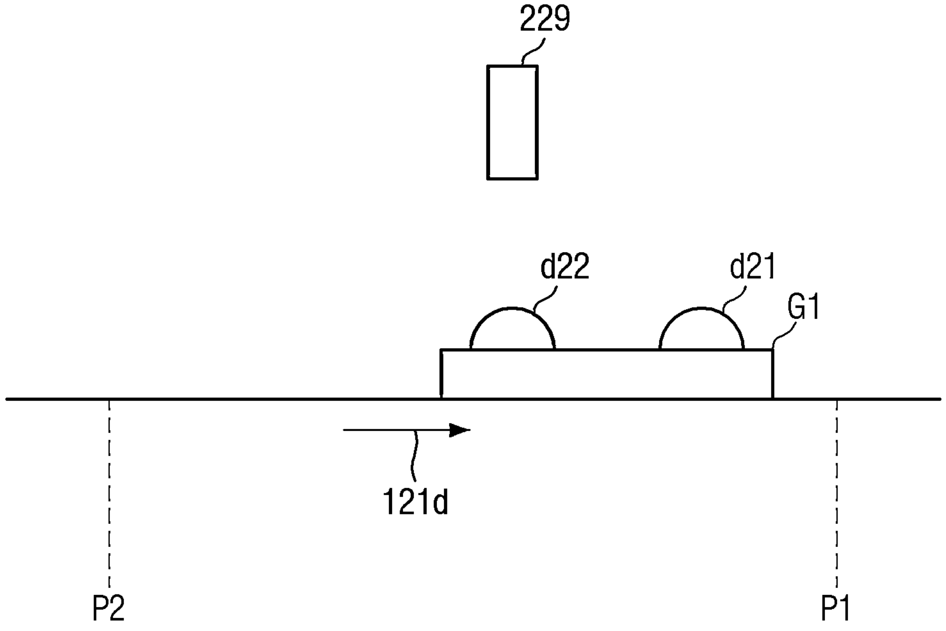

Next, referring to FIG. 9, while moving the substrate G1 from the second position P2 to the first position P1 again (see reference numeral 121*d*), a fourth droplet d22 is discharged into the second region of interest using the first nozzle 229. Since the second droplet (i.e., d21, d22) fell into the second region of interest, the droplet size in the second region of interest increases.

Figure 10:
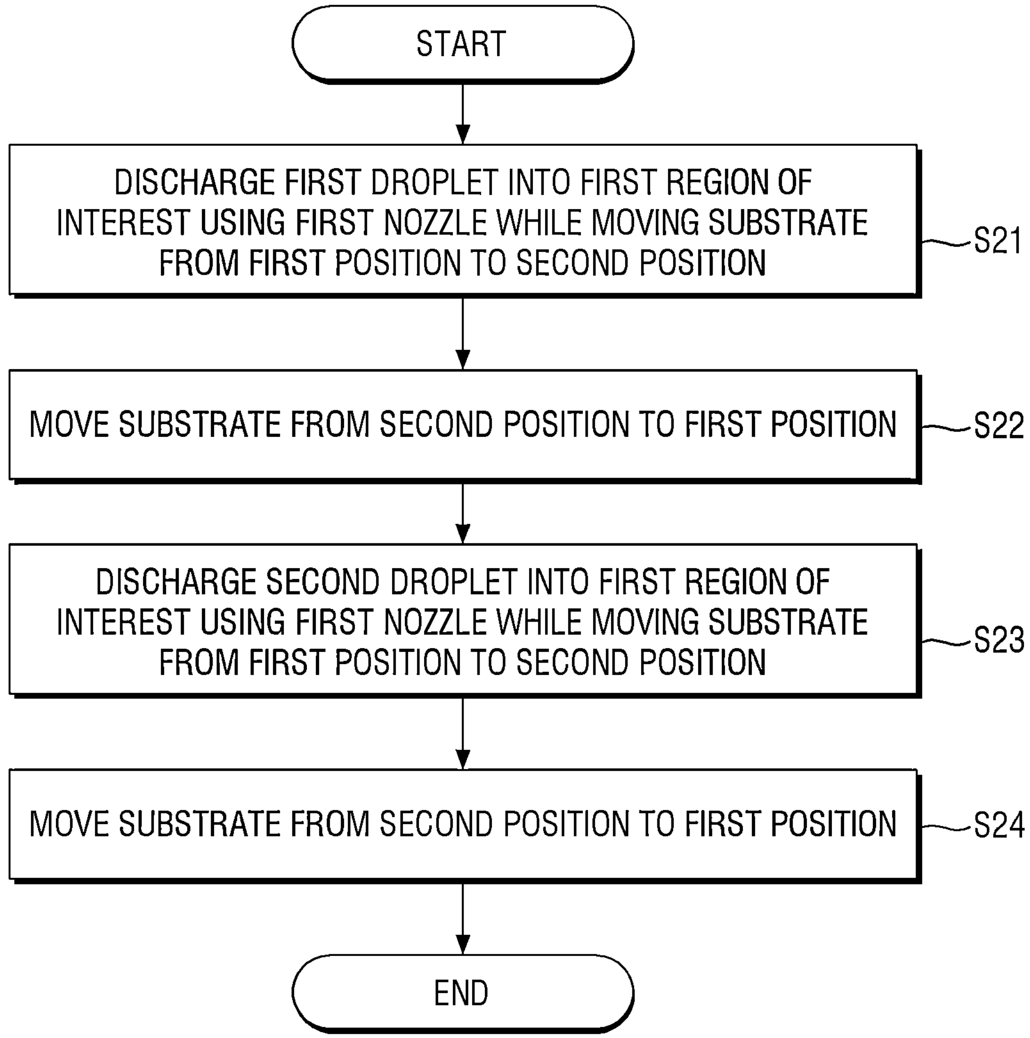
FIG. 10 is a flowchart for describing a third example of the inspection pattern forming step S1 of FIG. 3.

FIG. 10 is a flowchart for describing a third example of the inspection pattern forming step S1 of FIG. 3. For convenience of description, the points different from those described with reference to FIGS. 6 to 9 will be mainly described.

Referring to FIG. 10, while moving the substrate G1 from the first position P1 to the second position P2, a droplet (first droplet) is discharged into the first region of interest using the first nozzle (S21).

Next, the substrate G1 is moved from the second position P2 to the first position P1 (S22). While moving from the second position P2 to the first position P1, the droplet discharging operation is not performed.

Then, while moving the substrate G1 from the first position P1 to the second position P2, an additional droplet (second droplet) is discharged into the first region of interest using the first nozzle (S23). Due to the additional droplet discharge, the droplet size in the first region of interest increases.

Next, the substrate G1 is moved from the second position P2 to the first position P1 (S24). While moving from the second position P2 to the first position P1, the droplet discharging operation is not performed.

Figure 11:
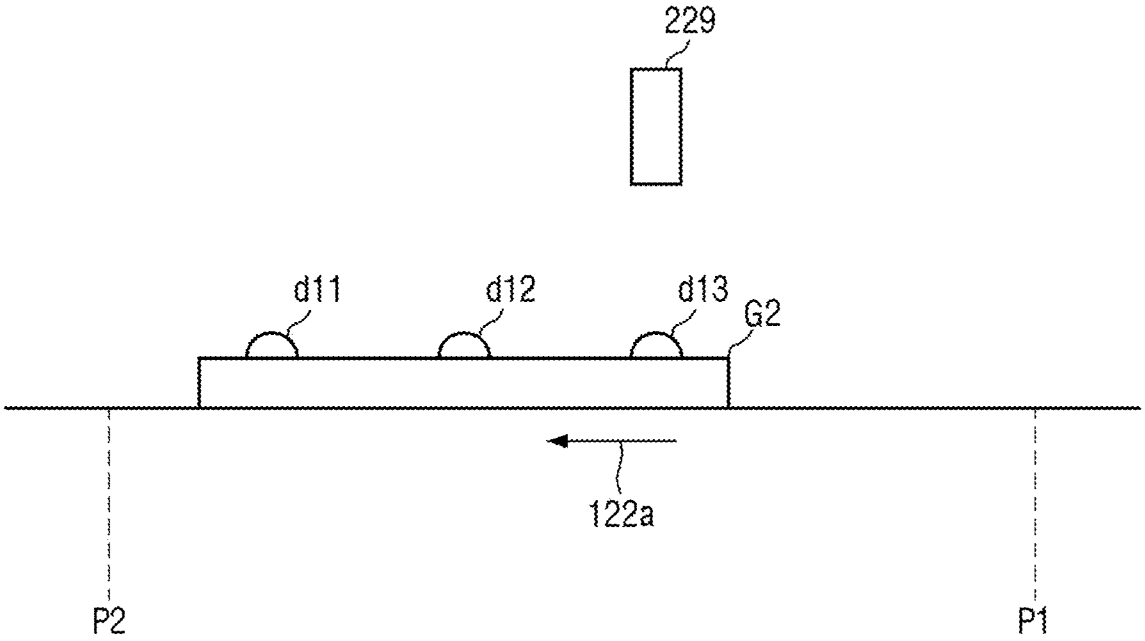
FIGS. 11 and 12 are views of intermediate steps for describing a fourth example of the inspection pattern forming step S1 of FIG. 3.
Figure 12:
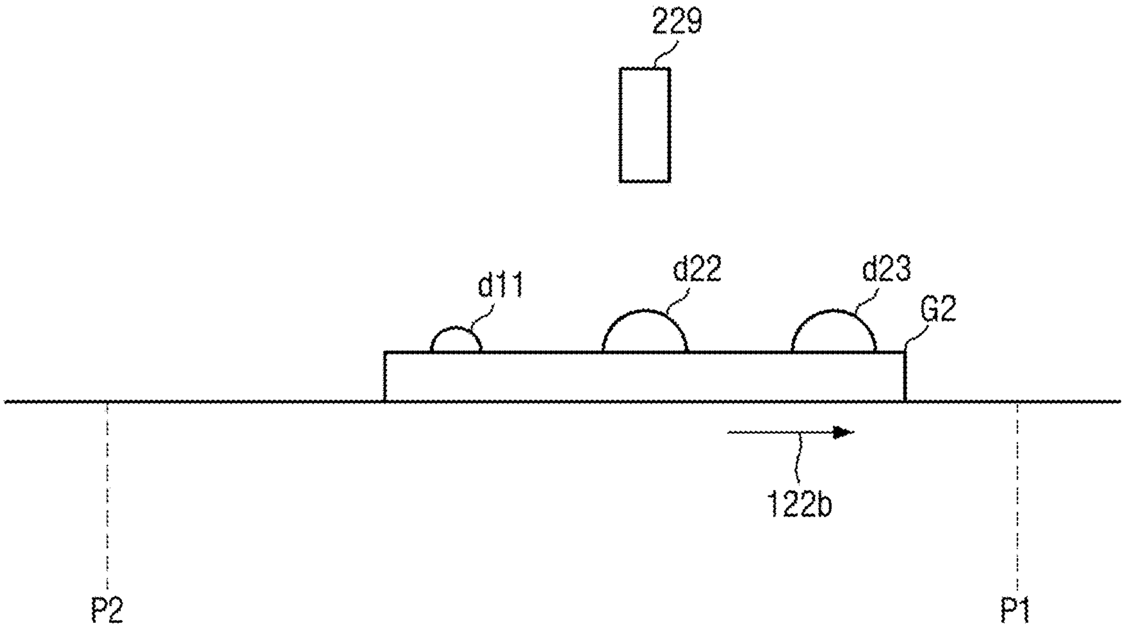

FIGS. 11 and 12 are views of intermediate steps for describing a fourth example of the inspection pattern forming step S1 of FIG. 3.

Referring to FIG. 11, while moving the substrate G2 from the first position P1 to the third position P3 (see reference numeral 122*a*), the first droplet d11, the second droplet d12, and the third droplet d13 are sequentially discharged to the first region of interest, the second region of interest and the third region of interest, respectively, using the first nozzle 229.

Referring to FIG. 12, while moving the substrate G2 from the third position P3 to the first position P1 (see reference numeral 122*b*), a fourth droplet d23, a fifth droplet d22, and a sixth droplet are sequentially discharged to the third region of interest, the second region of interest, and the first region of interest, respectively, using the first nozzle 229. FIG. 12 shows the shape after the fifth droplet d22 is discharged and before the sixth droplet is discharged.

Figure 13:
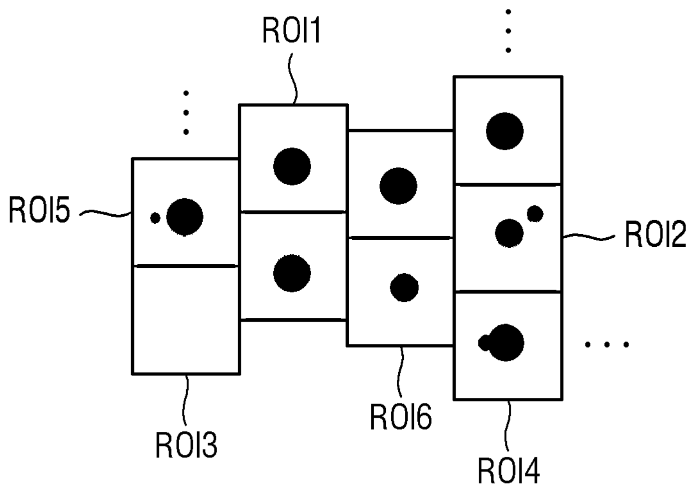
FIG. 13 exemplarily illustrates an inspection pattern formed by an inkjet head module.

FIG. 13 exemplarily illustrates an inspection pattern formed by an inkjet head module.

Referring to FIG. 13, the first region of interest (ROI1) corresponds to a normal discharged case.

The second region of interest (ROI2), the fourth region of interest (ROI4), and the third region of interest (ROI5) are cases, in which a plurality of droplets are discharged to unequal positions. That is, it corresponds to a case, in which a plurality of droplets are not discharged to the correct positions. This corresponds to “abnormal impact” or “satellite droplet formation.”

The third region of interest (ROI3) corresponds to a case, in which no droplet is discharged. This corresponds to “non-discharge.”

The sixth region of interest (ROI6) corresponds to a case, in which a plurality of droplets are discharged to the correct position, but are not discharged by a preset discharge amount. This corresponds to “defective discharge amount.”

Hereinafter, the defect determining step S2 of FIG. 3 will be described in detail with reference to FIGS. 14 to 17.

Figure 14:
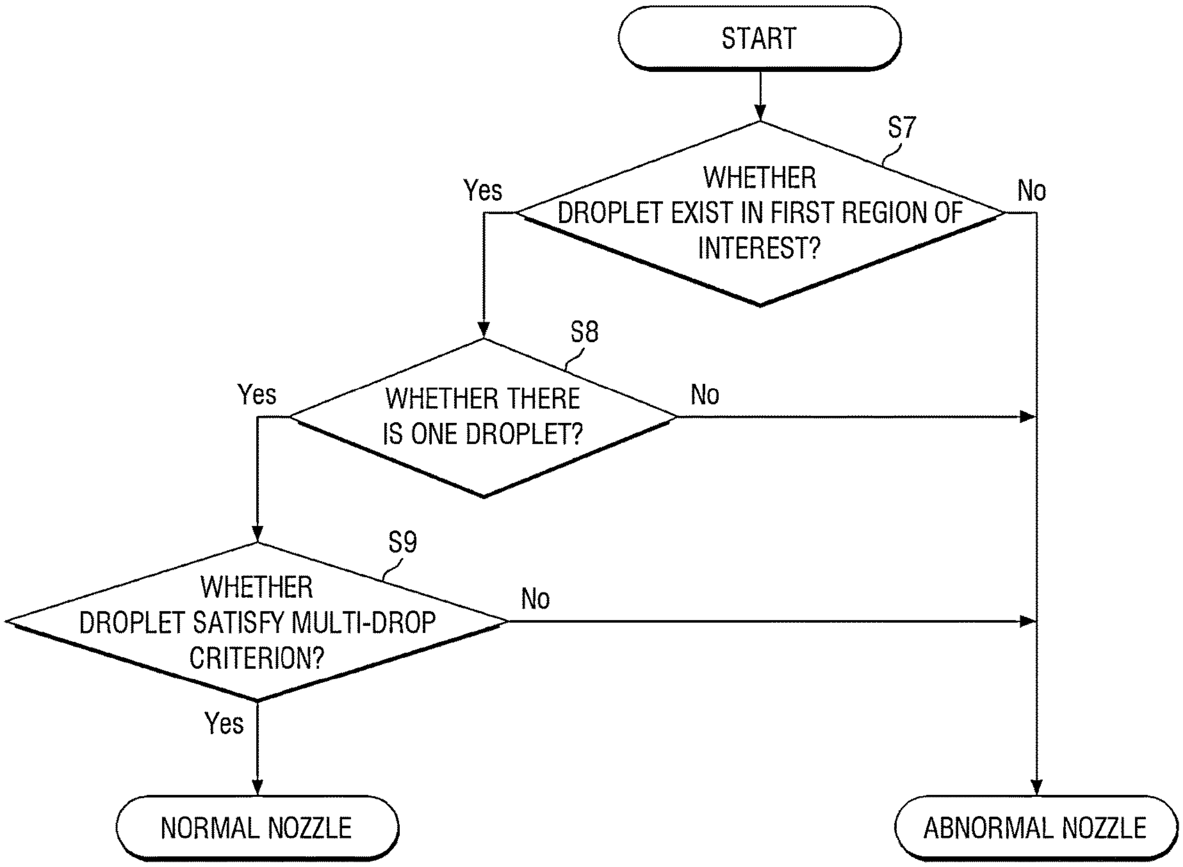
FIG. 14 is a flowchart for describing the defect determining step S2 of FIG. 3.

FIG. 14 is a flowchart for describing the defect determining step S2 of FIG. 3.

Referring to FIG. 14, it is first determined whether a droplet satisfying a minimum criterion exists in the first region of interest (S7).

In step S7, if there is a droplet that satisfies the minimum criterion (Yes), the flow advances to the next step (S8). If there is no droplet that satisfies the minimum criterion (No), it is determined that the nozzle that discharged the droplet is an abnormal nozzle (or a defective nozzle).

Figure 15:
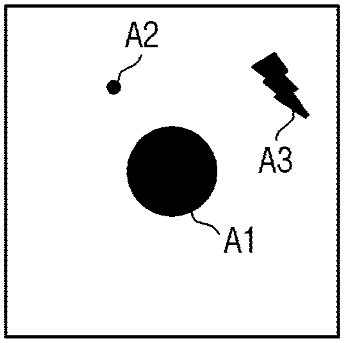
FIGS. 15 to 17 are exemplary droplet shapes for describing the defect determining step.

Specifically, as illustrated in FIG. 15, the first droplet A1 and the second droplet A2 may have a circular shape, and the third droplet A3 may have an irregular shape in the region of interest. The irregular-shaped third droplet A3 is determined to be caused by particles or caused by uneven flooring, and is excluded from the determination. That is, the third droplet A3 is not determined to be a droplet. Accordingly, the droplet to be determined (that is, a droplet that satisfies the minimum criterion) becomes A1 and A2.

Figure 16:
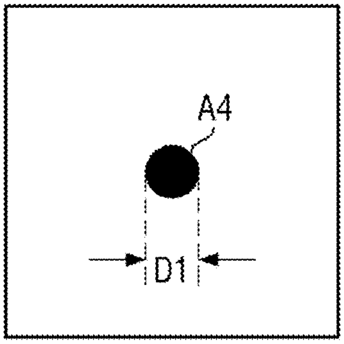

Alternatively, as shown in FIG. 16, the fourth droplet A4 has a circular shape in the region of interest and is a droplet to be determined.

Next, if there is a droplet that satisfies the minimum criterion in step S7, it is determined whether there is only one droplet (S8). In step S8, if there is only one droplet (Yes), the flow advances to the next step (S9). If it is determined that there are two or more droplets (No), the nozzle that discharged the droplets is determined as an abnormal nozzle.

Specifically, since it is determined that there are two droplets A1 and A2 in FIG. 15, the nozzle that discharged the droplets is determined as an abnormal nozzle. Since it is determined that there is only one droplet A4 in FIG. 16, the flow advances to the next step S9.

Next, it is determined whether the droplet satisfies a multi-drop criterion (S9). In step S9, if the droplet satisfies the multi-drop criterion (Yes), it is determined as a normal nozzle. If the droplet does not satisfy the multi-drop criterion (No), the nozzle that discharged the droplet is determined as an abnormal nozzle.

The multi-drip criterion may be determined based on the size (e.g., diameter, radius, circumference length) of the droplet. That is, it may be determined whether the size of the droplet is greater than or equal to the first reference value and less than or equal to the second reference value. That is, if the droplet is smaller than the first reference value, it is determined that the multi-drop criterion is not satisfied because the appropriate amount is not discharged (i.e., under drop). On the other hand, if the droplet is larger than the second reference value, it is determined that the multi-drop criterion is not satisfied because the appropriate amount is not discharged (i.e., excessive drop).

The diameter of the droplet A4 in FIG. 16 is D1 and may be determined to be smaller than the first reference value. Accordingly, the nozzle that discharged the droplet A4 of FIG. 16 may be determined as an abnormal nozzle.

Meanwhile, in addition to the method described with reference to FIGS. 14 to 16, an additional method may be used.

Figure 17:
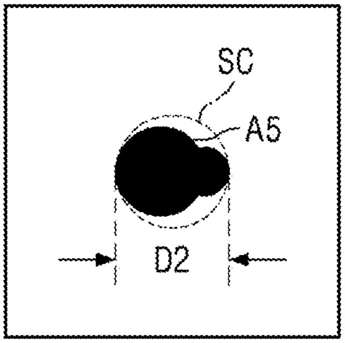

For example, a snowman-shaped droplet A5 as shown in FIG. 17 may be formed in the region of interest. The snowman-shaped droplet A5 may be determined similar to the irregular-shaped droplet (see A3 of FIG. 15) and excluded. However, if not excluded, since there is only one snowman-shaped droplet A5 in FIG. 17, the nozzle that discharged the droplet A5 of FIG. 17 may be determined as a normal nozzle (that is, there is a possibility of error). To compensate for this, it is assumed that the reference circle SC corresponding to the diameter D2 of the droplet A5, and it may be calculated how much the area of the droplet A5 differs from the area of the reference circle SC (i.e., it is determined whether the area of the droplet is greater than or equal to the reference ratio compared to the area of the reference circle). For example, since the area of the snowman-shaped droplet A5 is less than the reference ratio (for example, 90%) compared to the area of the reference circle SC, the nozzle that discharged the droplet A5 may be determined as a normal nozzle.

Alternatively, by comparing the circumference length of the droplet A5 with the circumference length of the reference circle SC, if the difference is small, it may be determined as a normal nozzle, and if the difference is large, it may be determined as an abnormal nozzle. For example, since the circumference length of the snowman-shaped droplet A5 is different from the circumference length of the droplet A5 by more than a reference value, it may be determined as an abnormal nozzle.

Alternatively, the reference circumference length of the normal droplet can be known in advance through an experiment or the like when discharge is performed n times. Therefore, it is also possible to measure the circumference length of the droplet to be evaluated and determine whether the nozzle is abnormal by comparing the circumference length with the reference circumference length.

Figure 18:
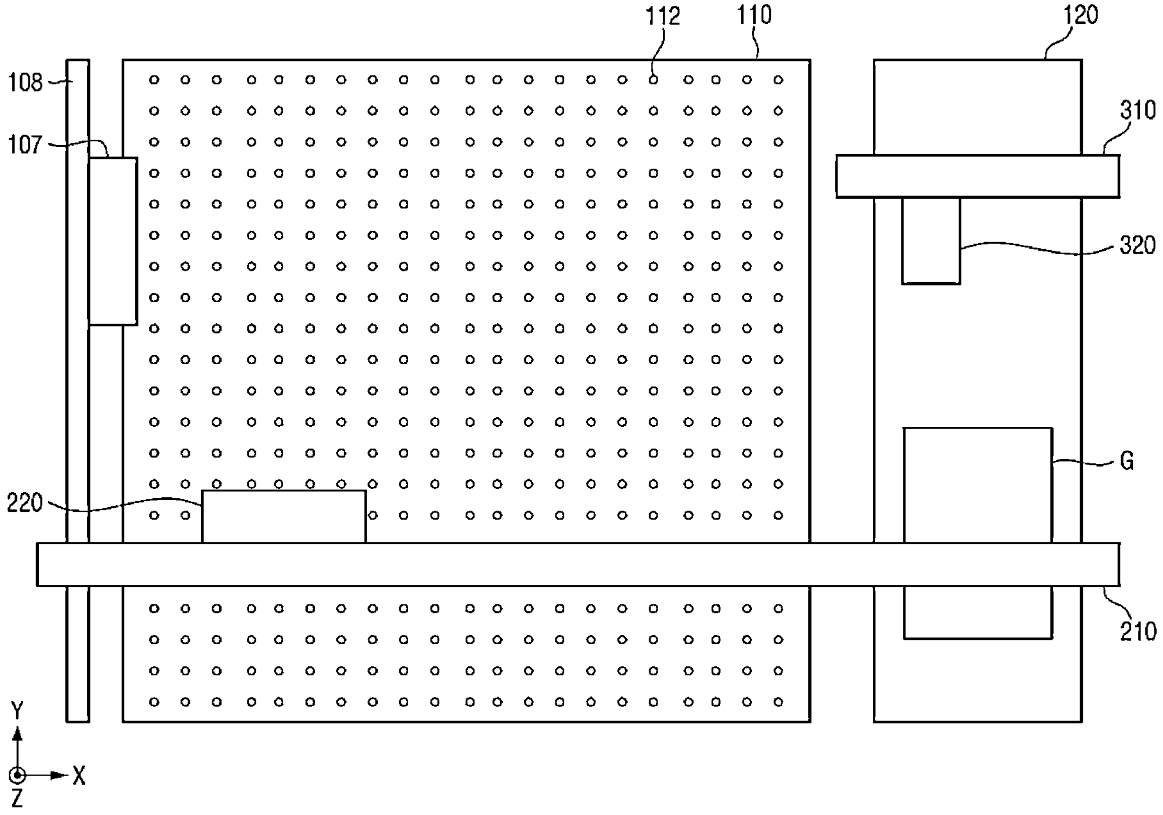
FIG. 18 is a conceptual diagram illustrating a substrate processing apparatus, to which a nozzle inspection apparatus according to some embodiments of the present invention is applied.

FIG. 18 is a conceptual diagram illustrating a substrate processing apparatus, to which a nozzle inspection apparatus according to some embodiments of the present invention is applied. Contents substantially the same as those described with reference to FIGS. 1 and 2 will be omitted.

Referring to FIG. 18, the substrate processing apparatus includes a first stage 110, a second stage 120, a first gantry 210, a second gantry 310, an inkjet head module 220, a vision module 320, a holder 107 and the like.

The first stage 110 is disposed in the first region, and the second stage 120 is disposed in a second region adjacent to the first region.

A rail 108 is disposed along the longitudinal direction of the first stage 110. The holder 107 is movable along the rail 108. A plurality of holes 112 are formed in the first stage 110, and gas may come out through the holes 112 to float the manufacturing substrate. In a state, in which the manufacturing substrate is floated, the holder 107 may hold and move the manufacturing substrate.

The first gantry 210 is disposed to cross the first stage 110 and the second stage 120. The inkjet head module 220 is installed on the first gantry 210, and may move along the first gantry 210 to discharge droplets in the first stage 110 or the second stage 120.

The inspection substrate G is located on the second stage 120, and the inkjet head module 220 discharges a plurality of droplets into the first region of interest of the inspection substrate G to form an inspection pattern.

For example, after moving the substrate G to the position P0 where the droplet is to be discharged, the substrate G is stopped. In a state, in which the substrate G is stopped, the inkjet head module 220 discharges a droplet into the region of interest (ROI) of the substrate multiple times.

Alternatively, while moving the substrate G from the first position P1 to the second position P2, the inkjet head module 220 discharges droplets in the first region of interest, and then while moving the substrate G from the second position P2 to the first position P1 again, the inkjet head module 220 discharges droplets into the second region of interest. Then, while moving the substrate G from the first position P1 to the second position P2, the inkjet head module 220 additionally discharges droplets into the first region of interest. While moving the substrate G from the second position P2 to the first position P1 again, the inkjet head module 220 additionally discharges droplets into the second region of interest.

Alternatively, while moving the substrate G from the first position P1 to the second position P2, the inkjet head module 220 discharges a droplet in the first region of interest, and then the substrate G is moved back to the first position P1 from the second position P2. Then, while moving the substrate G from the first position P1 to the second position P2, the inkjet head module 220 additionally discharges droplets into the first region of interest.

Alternatively, while moving the substrate G from the first position P1 to the third position P3, the inkjet head module 220 sequentially discharges droplets to each of the first region of interest, the second region of interest, and the third region of interest. Then, while moving the substrate G from the third position P3 to the first position P1, the inkjet head module 220 additionally discharges droplets in the order of the third region of interest, the second region of interest, and the first region of interest.

The vision module 320 photographs the formed inspection pattern.

The control module (see 500 of FIG. 1) determines whether the nozzle of the inkjet head module 220 that discharged the droplet is defective based on the photographed inspection pattern. As described above, the control module 500 may determine whether a droplet in the region of interest satisfies a multi-drop criterion. The multi-drip criterion may be determined based on the size (e.g., diameter, radius, circumference length) of the droplet.

Although embodiments of the present invention have been described with reference to the above and the accompanying drawings, those skilled in the art, to which the present invention pertains, can understand that the present invention may be practiced in other specific forms without changing its technical spirit or essential features. Therefore, it should be understood that the embodiments described above are illustrative in all respects and not limiting.

What is claimed is:

1. A method for inspecting a nozzle comprising:

discharging a plurality of droplets into a first region of interest of a substrate using a first nozzle to form an inspection pattern, and determining whether the first nozzle is defective based on the inspection pattern, wherein forming of the inspection pattern comprises:

discharging a first droplet into the first region of interest using the first nozzle while moving the substrate from a first position to a second position, moving the substrate from the second position to the first position, and discharging a second droplet into the first region of interest using the first nozzle while moving the substrate from the first position to the second position.

2. The method of claim 1, wherein forming the inspection pattern comprises, stopping the substrate at a first position, and discharging a plurality of droplets into a first region of interest of the stopped substrate using the first nozzle.

3. The method of claim 1, wherein moving the substrate from the second position to the first position comprises, discharging a third droplet into a second region of interest different from the first region of interest using the first nozzle while moving the substrate from the second position to the first position.

4. The method of claim 3 further comprises, after discharging a second droplet into the first region of interest, discharging a fourth droplet into the second region of interest using the first nozzle while moving the substrate from the second position to the first position.

5. The method of claim 1, wherein forming the inspection pattern comprises, sequentially discharging a first droplet, a second droplet, and a third droplet to the first region of interest, a second region of interest, and a third region of interest, respectively, using the first nozzle while moving the substrate from a first position to a third position, sequentially discharging a fourth droplet, a fifth droplet, and a sixth droplet to the third region of interest, the second region of interest, and the first region of interest, respectively, using the first nozzle while moving the substrate from the third position to the first position.

6. The method of claim 1, wherein determining whether the first nozzle is defective based on the inspection pattern comprises determining whether a size of the inspection pattern is equal to or greater than a first reference value.

7. The method of claim 1, wherein determining whether the first nozzle is defective based on the inspection pattern comprises determining whether only one inspection pattern exists in the first region of interest.

8. The method of claim 1, wherein determining whether the first nozzle is defective based on the inspection pattern comprises determining whether an area of the inspection pattern occupies a second reference value or more compared to an area of a reference circle.

9. The method of claim 1, wherein the substrate is a substrate for inspection.

10. An apparatus for inspecting a nozzle comprising:

a stage, on which a substrate is movable;

an inkjet head module disposed on the stage and including a first nozzle for forming an inspection pattern by discharging a plurality of droplets into a first region of interest of the substrate;

a vision module disposed on the stage and configured to be movable in a direction different from a direction of moving the substrate and photograph the inspection pattern; and a control module for determining whether the first nozzle is defective based on the photographing result.

11. The apparatus of claim 10, wherein the stage stops the substrate at a first position, wherein the first nozzle of the inkjet head module discharges a plurality of droplets into a first region of interest of the stopped substrate.

12. The apparatus of claim 10, wherein the first nozzle of the inkjet head module discharges a first droplet into the first region of interest while the substrate moves from the first position to the second position, wherein the first nozzle of the inkjet head module discharges a second droplet into a second region of interest different from the first region of interest while the substrate moves from the second position to the first position, wherein a third droplet is discharged into the first region of interest using the first nozzle of the inkjet head module while the substrate moves from the first position to the second position.

13. The apparatus of claim 10, wherein the control module determines whether a size of the inspection pattern is equal to or greater than a first reference value.

14. The apparatus of claim 10, wherein the control module determines whether only one inspection pattern exists in the first region of interest.

15. An apparatus for processing a substrate comprising:

a first stage disposed in a first region;

a second stage disposed in a second region;

a gantry disposed to cross the first stage and the second stage;

an inkjet head module installed on the gantry and capable of discharging a droplet in the first stage or the second stage; and a vision module disposed on the second stage, wherein the second stage can move an inspection substrate, wherein the inkjet head module discharges a plurality of droplets into a first region of interest of the inspection substrate to form an inspection pattern, wherein the vision module photographs the inspection pattern.

16. The apparatus of claim 15, wherein the second stage stops the inspection substrate at a first position, wherein the first nozzle of the inkjet head module discharges a plurality of droplets into a first region of interest of the stopped inspection substrate.

17. The apparatus of claim 15, wherein the first nozzle of the inkjet head module discharges a first droplet into the first region of interest while the inspection substrate moves from a first position to a second position, wherein the first nozzle of the inkjet head module discharges a second droplet into a second region of interest different from the first region of interest while the inspection substrate moves from the second position to the first position, wherein a third droplet is discharged into the first region of interest using the first nozzle of the inkjet head module while the inspection substrate moves from the first position to the second position.

18. The apparatus of claim 15 further comprises, a control module for determining whether a size of the inspection pattern is equal to or greater than a first reference value.

19. The apparatus of claim 15 further comprises, a control module for determining whether only one inspection pattern exists in the first region of interest.

* * * * *